F. DURR.
APPARATUS FOR INJECTING FUEL INTO INTERNAL COMBUSTION MOTORS.
APPLICATION FILED DEC. 17, 1907.
924,044.
Patented June 8, 1909.
2 SHEETS—SHEET 1.
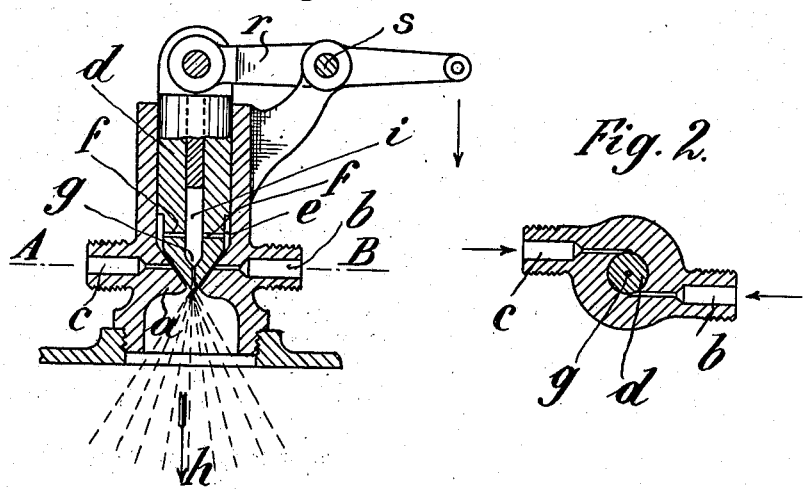
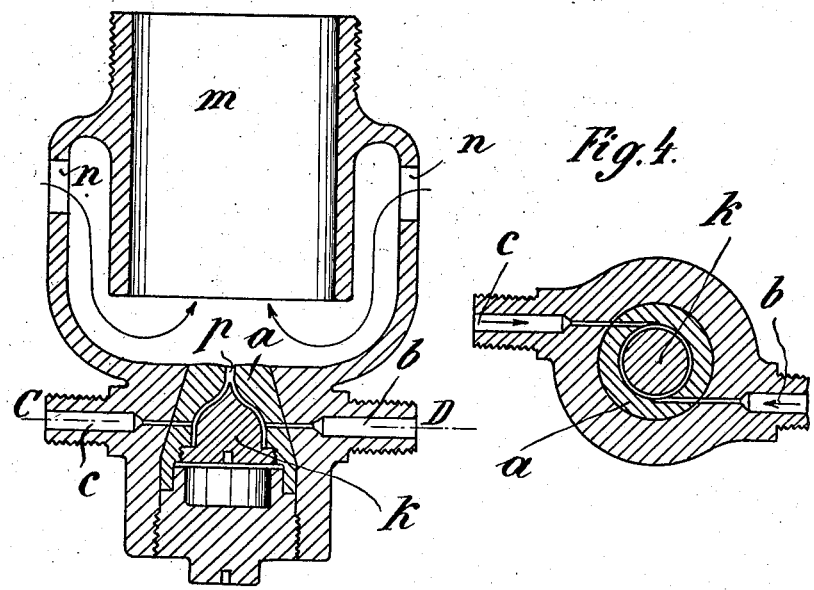

F. DÜRR.
APPARATUS FOR INJECTING FUEL INTO INTERNAL COMBUSTION MOTORS.
APPLICATION FILED DEC. 17, 1907.

924,044.

Patented June 8, 1909.
2 SHEETS—SHEET 2.

UNITED STATES PATENT OFFICE.

FRITZ DÜRR, OF FRANKFORT-ON-THE-MAIN, GERMANY.

APPARATUS FOR INJECTING FUEL INTO INTERNAL-COMBUSTION MOTORS.

No. 924,044.          Specification of Letters Patent.          Patented June 8, 1909.

Application filed December 17, 1907. Serial No. 406,920.

*To all whom it may concern:*

Be it known that I, FRITZ DÜRR, engineer, a subject of the German Emperor, and residing at 134 Oederweg, Frankfort-on-the-Main, Germany, have invented certain new and useful Improvements in Apparatus for Injecting Fuel into Internal-Combustion Motors, of which the following is a specification.

This invention relates to an improved method of injecting fuel into internal combustion motors and apparatus therefor.

Internal combustion engines wherein the fuel is injected into the working cylinder under pressure, and in which at the same time compressed air is introduced with the fuel in order to obtain a better diffusion of the latter, work with a fuel-pump and an air-pump. Also for both the fuel and compressed air a special regulating valve is required.

By the present invention the method of injection is considerably simplified. The pump for the liquid fuel is omitted and the regulation of the fuel and air is effected by the same valve. The fuel is carried in a vessel and is under considerable air-pressure and from this vessel it is conducted through an air and a fuel pipe to the injection nozzle.

The annexed drawings show two embodiments of the invention.

Figure 5:
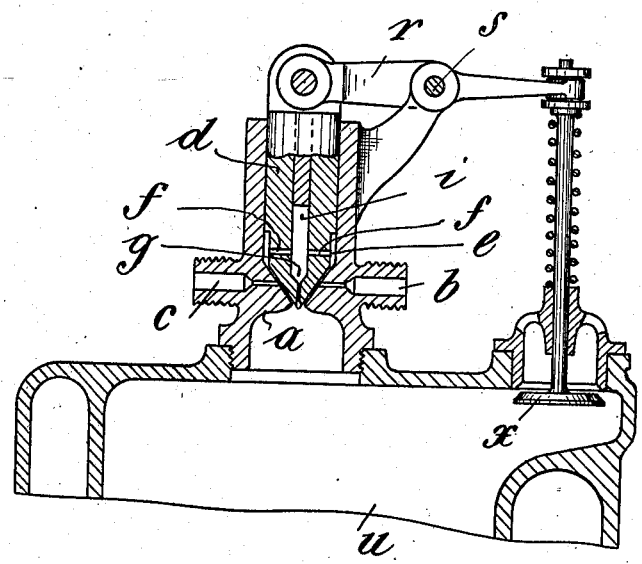

In the drawings:—Figures 1 and 3 are longitudinal sections, of the two embodiments. Fig. 2 is a cross section on line A—B of Fig. 1; Fig. 4 is a cross section on line C—D of Fig. 3; Fig. 5 is a longitudinal section in which the device illustrated in Fig. 1, is shown connected with the cylinder of the engine; and Fig. 6 is a similar longitudinal section in which the device shown in Fig. 3 is shown connected up with the cylinder of the engine.

The air pressure is constantly maintained by connecting the apparatus with an air pump which can be of any suitable construction, and which is not shown in the drawing. The air pump supplies the fuel vessel at all times with air in excess, said excess of air escaping through a safety-valve. The air pipe and the fuel pipe are connected to the unions *b*, *c* which terminate in the injector nozzle *a*. The entrance of the fuel is tangentially effected as regards the nozzle, as can be seen from Fig. 2, so that a whirling movement is produced. Should air and fuel be admitted under equal pressure through *c* and *b* respectively, (see Fig. 1), the air being lighter than the fuel will be ejected quicker in all directions, part goes downward, but by far the largest part will move upward and fill the chamber *e* above the valve. This action will occur when the valve *d* which engages in the nozzle, is lifted, the said valve being moved by the motor through the agency of the lever *r* pivoted at *s*. The fluid fuel being heavier will therefore flow downward, takes a whirling movement and is drawn along and diffused partly by its own pressure and partly by the compressed air, which flows out of the interior of the chamber *e* and passes through the radial channels *f* and axial bore *g* provided in the valve *a* in the direction of arrow *h*. The arrangement of the small chamber *e* for supplying the compressed air connected to the channels *f g* and an axial chamber *i* in the valve, has a further advantage. In nearly all injecting apparatus, a slight quantity of undiffused fuel remains after the closing of the valve, which is not completely burned. In the present apparatus, the compressed air in *e* and *i* escapes after the closing of the valve and takes the remaining portions of the fuel which is still in the nozzle, with it.

As shown in Fig. 5, the cone-valve *d* is adapted to be actuated by the air-admission valve *x* opening into the working cylinder *u* of the motor.

Figure 6:
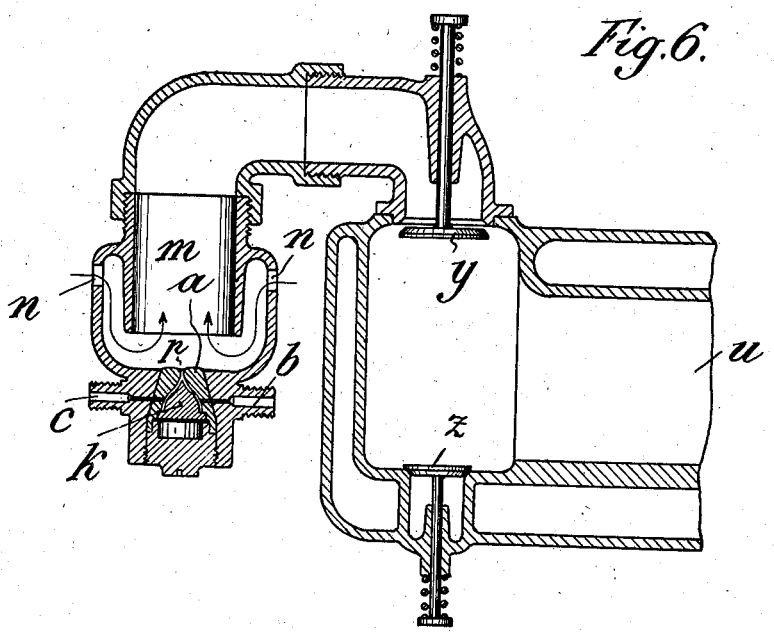

In the embodiment shown in Fig. 6, *y* is the admission valve for a mixture of air and gas and *z* the exhaust valve. In this embodiment, the injection nozzle is connected directly to the air-inlet within which it forms a mixture.

The described arrangement also enables a convenient starting of the motor. If the fuel and air ducts are each provided with a closing cock, and if the fuel duct is closed and the air duct opened, one can by lifting the valve in the apparatus, at first introduce a little air into the cylinder. Thereupon the valve is closed, the fuel-cock opened and the valve again opened for a short time, so that a mixture passes into the cylinder. If then the magnet is then put into action by hand, the first explosion will result and the motor start.

Almost equally efficient atomization can be obtained in the case of vaporizers in which only normal air-pressure acts on the fuel and in which the flow of fuel and air is caused solely by the lowering of pressure in a vaporizer $m$ (Fig. 3) arranged between the motor-cylinder and the fuel-tank. In this case air at one side and fuel at the other flow tangentially to the nozzle $a$ (Figs. 3 and 4) circulate around the cone $k$, which is not quite in contact with the wall of the nozzle, and then pass out of the nozzle into the vaporizer $m$, sucking atmospheric air through the lateral orifices $n$.

What I claim as my invention and desire to secure by United States Letters Patent is:

1. An apparatus for injecting fuel into internal combustion motors comprising a conical injector nozzle provided with supply-ports opening thereinto tangentially to its inner lateral surface; a valve for controlling the flow of fuel through the nozzle, said valve being provided with a fuel chamber in open communication with said nozzle.

2. An apparatus for injecting fuel into internal combustion motors comprising a conical nozzle provided with supply-ports, a valve cone for controlling the flow through said nozzle, said valve-cone being provided with a fuel chamber and adapted to form an injector with the walls of the nozzle; an annular chamber provided around said cone-valve above said supply-ports; and means for providing communicating channels between the annular chamber, the supply-ports and the cone-valve chamber.

3. In an apparatus for injecting fuel into an internal combustion motor, an injecting nozzle provided with supply-ports; a valve for said nozzle provided with a fuel chamber, an outer recess communicating with the fuel chamber by means of radial passage ways, and a downwardly opening orifice from the fuel-chamber; the walls of said nozzle being adapted to form with said piston, passages between the supply-ports and the outer recess, and between the supply-ports, and the tip of the nozzle.

4. In an apparatus for injecting fuel into an internal combustion motor, a conical nozzle provided with supply-ports in a plane transverse to the axis of the nozzle and tangential to conical surface thereof; and a conical valve for said nozzle conforming to the shape of the nozzle and adapted to form an injector for the fuel.

The foregoing specification signed at Berlin, Germany, this fourth day of December, 1907.

FRITZ DÜRR.

In presence of two witnesses—
HENRY HASPER,
WOLDEMAR HAUPT.